United States Patent
Fujii et al.

(10) Patent No.: US 7,704,619 B2
(45) Date of Patent: Apr. 27, 2010

(54) FUEL CELL SYSTEM AND METHOD OF CONTROLLING SAME

(75) Inventors: Yosuke Fujii, Shimotsuke (JP); Takahiro Takai, Utsunomiya (JP)

(73) Assignee: Honda Motor Co., Ltd., Tochigi (JP)

( * ) Notice: Subject to any disclaimer, the term of this patent is extended or adjusted under 35 U.S.C. 154(b) by 927 days.

(21) Appl. No.: 11/354,359

(22) Filed: Feb. 14, 2006

(65) Prior Publication Data
US 2006/0188766 A1 Aug. 24, 2006

(30) Foreign Application Priority Data
Feb. 18, 2005 (JP) ............................. P2005-042071

(51) Int. Cl.
*H01M 8/04* (2006.01)
*B60L 11/18* (2006.01)

(52) U.S. Cl. ............................ 429/23; 429/13; 180/65.3
(58) Field of Classification Search .................... 429/13, 429/23
See application file for complete search history.

(56) References Cited
FOREIGN PATENT DOCUMENTS

| JP | 2002-313396 | 10/2002 |
| JP | 2002313396 A * | 10/2002 |
| WO | WO 2005011038 A * | 2/2005 |

* cited by examiner

Primary Examiner—Patrick Ryan
Assistant Examiner—Karie O'Neill Apicella
(74) Attorney, Agent, or Firm—Fish & Richardson P.C.

(57) ABSTRACT

A fuel cell system includes a fuel cell having a stack composed of stacked cells that generate electrical power from anode gas and cathode gas; a cell voltage measuring device connected to the cells to measure the voltages of the cells, the cell voltage measuring device outputting a first predetermined value as a measurement value when the voltage of the cell being measured is at or below a detection limit; a stack voltage measuring device connected to the stack that measures the voltage of the stack; and a control unit that restricts the current flowing though the fuel cell when the difference between the sum of the individual voltages of the cells measured by the cell voltage measuring device and the voltage of the stack measured by the stack voltage measuring device exceeds a second predetermined value.

6 Claims, 5 Drawing Sheets

FUEL CELL SYSTEM AND METHOD OF CONTROLLING SAME

BACKGROUND OF THE INVENTION

1. Field of the Invention

The present invention relates to a fuel cell system provided with a fuel cell of a structure having a stack including a plurality of stacked cells, and a method of controlling same.

Priority is claimed on Japanese Patent Application No. 2005-42071, filed Feb. 18, 2005, the content of which is incorporated herein by reference.

2. Description of Related Art

In recent years, a fuel cell vehicle equipped with a fuel cell as a vehicle drive source has been proposed. As this type of fuel cell, there is known one having a stack including a plurality of cells, each cell consisting of a membrane and electrode assembly (MEA), in which a solid polymer electrolyte membrane is held between an anode and a cathode, and sandwiched by separators. By introducing hydrogen (fuel gas) to the anode and air (oxidizing gas) to the cathode, electricity is generated by an electrochemical reaction between the hydrogen and the oxygen. Moreover, water is produced with this generation of electrical energy (so-called "produced water").

In this type of fuel cell, when, for example, generating electricity in a low-temperature environment, the reaction surface area of an MEA becomes covered with produced water and ice that is produced by freezing of the produced water. This leads to insufficient diffusion of the reactant gases, which may lower the cell voltage. Also, when an MEA is excessively dry, generation of electrical power does not fully take place, leading to a drop in cell voltage.

When the voltage of a cell drops, the conductivity of protons (hydrogen ions) produced at the anode side of the solid polymer electrolyte membrane of the MEA falls, leading to excessive heat generation due to movement of the protons from the anode side to the cathode side. As a result, the temperature of the fuel cell rises, causing degradation of the components (electrolyte membrane, catalyst layer, separators) constituting the fuel cell.

As technology aimed at prevention of this situation, Japanese Unexamined Patent Application, First Publication No. 2002-313396 proposes detecting drops in cell voltage and stopping the system when the cell voltage falls below a predetermined voltage.

When the conductivity of the aforementioned protons (hydrogen ions) falls in one cell that constitutes the fuel cell (such a cell suitably being called a "failed cell"), the electromotive force generated at the other cells acts on that portion. This is equivalent to the state in which, for example, when one battery in a group connected in series acts as resistance without supplying electric power, the electromotive force of the other batteries ends up acting on the portion serving as resistance. Thereby, the drop in voltage at the failed cell acting as resistance increases, the voltage becoming extremely lower than during normal operation to be well below 0 V.

In this state, the performance of the failed cell suffers due to the heat generation that occurs at the failed cell due to the application of the electromotive force of the other cells, in addition to heat generation by power generation. Accordingly, in order to prevent this state, it is extremely important to detect the voltage of each cell not only when in a normal state but also when in a state of power generation failure.

In order to detect a drop in the above-mentioned cell voltage, a sensor is therefore required that detects a wide range of voltages including the range of 0 V and less. But generally there is an inverse relationship between the detection accuracy and the detection range of a sensor. The problem therefore arises that when performing control using a sensor with a wide range of detection, the detection accuracy within the cell voltage range during normal operation falls. Also, installing another sensor just to detect drops in the cell voltage, apart from the sensor that detects the cell voltage during normal operation, complicates the entire system, leading to an increase in the number of components and cost as well as power consumption.

SUMMARY OF THE INVENTION

It is thus the object of the present invention to provide a fuel cell system that can suitably grasp the power generating state of a cell and ensure the power generation performance of a fuel cell while minimizing the number of parts, cost and power consumption, and a method of controlling the same.

The present invention provides a fuel cell system including: a fuel cell having a stack composed of stacked cells that generate electrical power from anode gas and cathode gas; a cell voltage measuring device connected to the cells to measure the voltages of the cells and output a first predetermined value as a measurement value when any of the cell voltages is at or below a detection limit; a stack voltage measuring device connected to the stack that measures the voltage of the stack; and a control unit that restricts the current flowing through the fuel cell when the difference between the sum of the individual voltages of the cells measured by the cell voltage measuring device and the voltage of the stack measured by the stack voltage measuring device exceeds a second predetermined value.

According to the present invention, since the detectable range of the cell voltage measuring device can be limited to the voltage range at the time of normal operation of the cell or plurality of cells, the measurement accuracy of the cell voltage measuring device can be sufficiently maintained even during normal power generation. The stack voltage measuring device also has sufficient accuracy required for measurement of the stack voltage.

When the conductivity of protons (hydrogen ions) falls in one cell that makes up the stack, and the electromotive force from the other cells acts on this cell, causing the voltage to fall significantly lower than during normal operation (that is, when the cell becomes a "failed cell"), the voltage of this failed cell falls to the detectable voltage limit or lower of the voltage measuring device. For this reason, the measured value of the failed cell becomes a fixed value. Meanwhile, the voltage which fell extremely due to the cell failure is reflected in the stack voltage measured by the stack voltage measuring device. Therefore, when the difference between the sum voltage of one or a plurality of cells measured by the cell voltage measuring device and the voltage of the stack measured by the stack voltage measuring device exceeds the first predetermined value, it can be determined that cell failure has occurred. Thereupon, the cell or cell group (plurality of cells) in which the fixed value is output by the cell voltage measuring device can be specified as a failed cell or failed cell group. Moreover, by restricting the current flowing through the fuel cell, excessive heat generation by the failed cell or cell group can be suppressed, thereby preventing degradation of the parts constituting the fuel cell and enabling continued operation of the system. In this manner, a failed cell can be detected without newly installing a sensor just to detect drops in the cell voltage. Thereby, the power generating state of the cell can be suitably grasped and the power generation performance of the fuel cell can be secured while minimizing the number of components and cost as well as power consumption. Here, the first predetermined value is a value which should be ensured to prevent degradation of a fuel cell. In other words, electrical power generation is permitted as long as the difference between the sum of the cell voltages and the stack voltage is equal to the first predetermined value or less.

The control unit may stop power generation of the fuel cell when the current flowing through the fuel cell cannot be restricted.

In this case, even when the current value cannot be restricted at the occurrence of the failed cell, by stopping power generation by the fuel cell, heat generation by the failed cell and heat generation caused by the electromotive force of other cells acting on the failed cell can be eliminated. This can prevent excessive heating of the failed cell and ensure the power generation performance of the fuel cell.

The present invention also provides a fuel cell system including: a fuel cell having a stack composed of stacked cells that generate electrical power from anode gas and cathode gas; a cell voltage measuring device connected to the cells to measure the voltages of the cells and output a first predetermined value as a measurement value when any of the cell voltages is at or below a detection limit; a stack voltage measuring device connected to the stack that measures the voltage of the stack; and a control unit that stops power generation by the fuel cell when the difference between the sum of the individual voltages of the cells measured by the cell voltage measuring device and the voltage of the stack measured by the stack voltage measuring device exceeds a second predetermined value.

Furthermore, the present invention provides a vehicle provided with a vehicle body, wheels attached to the vehicle body, and the above-mentioned fuel cell system.

According to this invention, since a failed cell can be detected without newly installing a sensor just to detect drops in the cell voltage, any required increase in space can be suppressed. Since cost and power consumption can be minimized, an increase in fuel consumption can be prevented. Also, the power generating state of the cells can be suitably grasped. This can serve to improve the reliability of running performance of vehicles in which fluctuations in air temperature, humidity or required production of electricity per unit time are great.

Moreover, the present invention provides a method of controlling a fuel cell system equipped with a fuel cell having a stack composed of stacked cells that generate electricity from anode gas and cathode gas, the method including a step to measure the voltages of the cells; a step to output a first predetermined value as a measurement value when the voltage of the cell being measured is at or below a detection limit; a step to measure the voltage of the stack; and a step to restrict the current flowing through the fuel cell when the difference between the sum of the voltages of the cells and the voltage of the stack-exceeds a second predetermined value.

Moreover, the present invention provides a method of controlling a fuel cell system with a fuel cell having a stack composed of stacked cells that generate electricity from anode gas and cathode gas, the method including a step to measure the voltages of the cells; a step to output a first predetermined value as a measurement value when the voltage of the cell being measured is at or below a detection limit; a step to measure the voltage of the stack; and a step to stop power generation of the fuel cell when the difference between the sum of the voltages of the cells and the voltage of the stack exceeds a second predetermined value.

DETAILED DESCRIPTION OF THE INVENTION

The fuel cell system in the embodiment of the present invention and method of controlling the same is described below with reference to the accompanying drawings. The present embodiment describes a fuel cell system in which a fuel cell is mounted in a vehicle.

Figure 1:
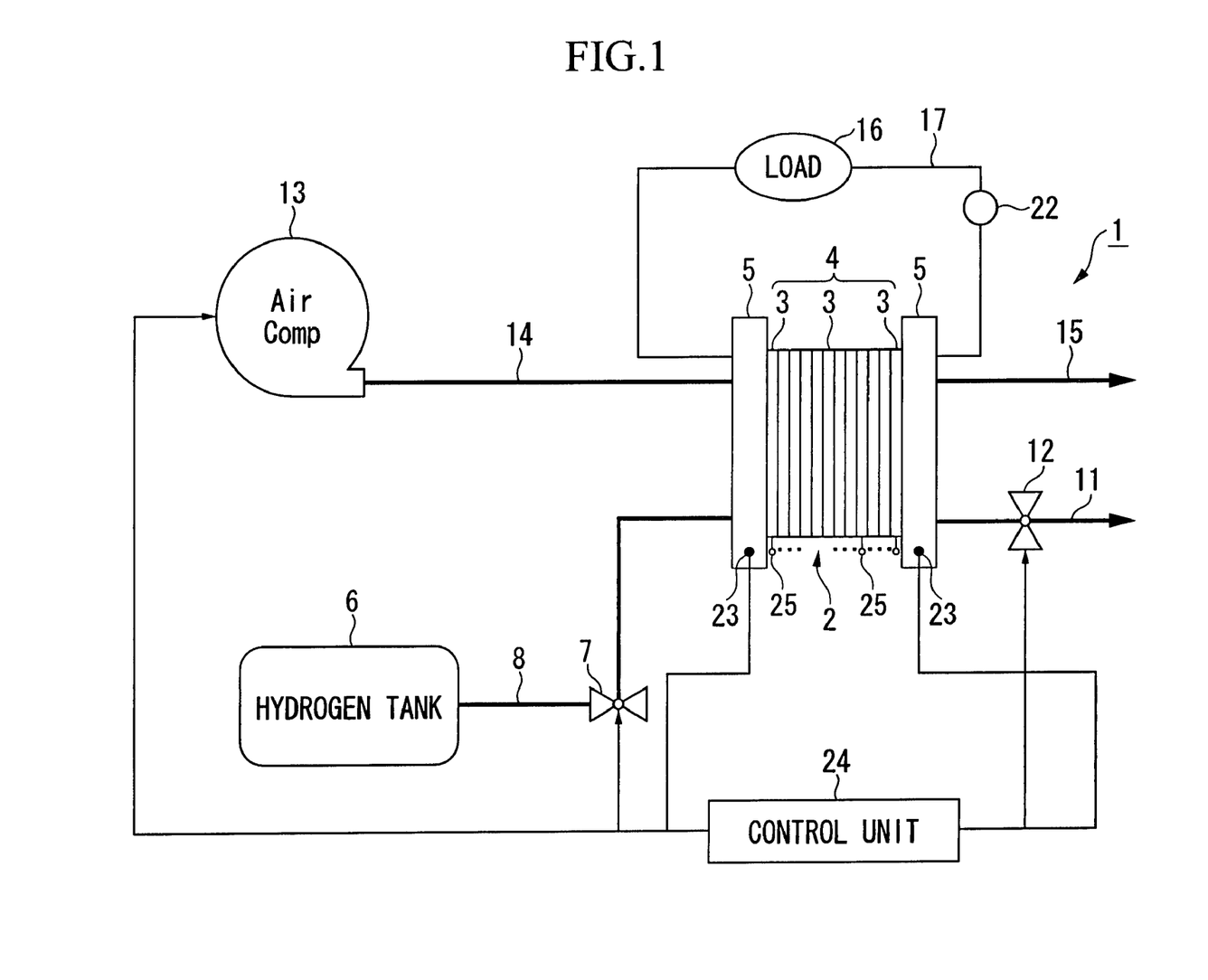
FIG. 1 is an overall configuration diagram of the fuel cell system in the embodiment of the present invention.

FIG. 1 is an overall configuration diagram of the fuel cell system in the embodiment of the present invention. A fuel cell 2 shown in the drawing consists of a stack 4 composed of a plurality of cells 3 stacked together, with the stack 4 being sandwiched by terminal plates 5. Each cell 3 has a membrane and electrode assembly (MEA), in which a solid polymer electrolyte membrane made of, for example, a solid polymer ion-exchange membrane is held between an anode and a cathode, with this membrane and electrode assembly being sandwiched by separators. Hydrogen is supplied to the anode of each cell as fuel, while air including oxygen is supplied to the cathode as oxidant. Hydrogen ions produced at the cathode by catalytic reaction pass through the electrolyte membrane to the cathode, where they react electrochemically with oxygen to generate electricity.

Water is produced at the cathode side during power generation, and since a portion of the produced water that occurs at the cathode side back-diffuses through the electrolyte membrane to the anode side, produced water is also present at the anode side.

Hydrogen supplied from a hydrogen tank 6 passes through a hydrogen supply route 8 via a cutoff valve 7 and a regulator (not shown) to be supplied to the anode of the fuel cell 2.

Also, a hydrogen off-gas discharge path 11 is connected to a dilution box (not shown), with used hydrogen off-gas being discharged from the hydrogen off-gas discharge path 11 to the dilution box.

Air is fed to an air supply path 14 by a compressor 13, to be supplied to the cathode of the fuel cell 2. The air supplied to the cathode of the fuel cell 2, after being supplied to power generation, is discharged as off-gas, along with residual water such as produced water on the cathode side, from the fuel cell 2 to an air off-gas discharge path 15.

The air off-gas discharge path 15 is connected to the aforementioned dilution box (not shown), and air off-gas discharged from the air off-gas discharge path 15 is mixed with hydrogen off-gas in the dilution box. Hydrogen off-gas discharged from the hydrogen off-gas discharge path 11 is thereby diluted by the dilution box to a predetermined concentration or less.

Moreover, the fuel cell 2 is provided with a cooling water path (not shown) equipped with a circulating pump that circulates the cooling water. Circulating cooling water during operation of the fuel cell 2 maintains the fuel cell 2 at a temperature suitable for electrochemical reaction (for example, 80° C.).

Also, the fuel cell 2 is connected via wiring 17 to a load 16 such as a motor that drives the vehicle, with power obtained by electric power generation by the fuel cell 2 being supplied to the load 16 via the wiring 17.

In the present embodiment, a current sensor 22 is provided in the path of the wiring 17 connected to the load 16 in order to measure a current I of the fuel cell 2. In addition, a stack voltage sensor 23 that measures a voltage Vs of the fuel cell stack 4 and cell voltage sensors 25 that measure a voltage Vci ($i=1$ to n, with n being the number of cells) of the cells 3 are also provided.

A control unit 24 for controlling the fuel cell system 1 is provided in the fuel cell system 1. The ignition switch (IG SW) is connected to this control unit 24. The ignition ON and OFF (IG-ON, IG-OFF) signal from the ignition switch, and the output values from the stack voltage sensor 23 and the cell voltage sensors 25 are input into the control unit 24. The control unit 24 outputs a signal to drive the cutoff valve 7, the compressor 13, and a hydrogen purge valve 12 based on these values and signal that were input.

Figure 4:
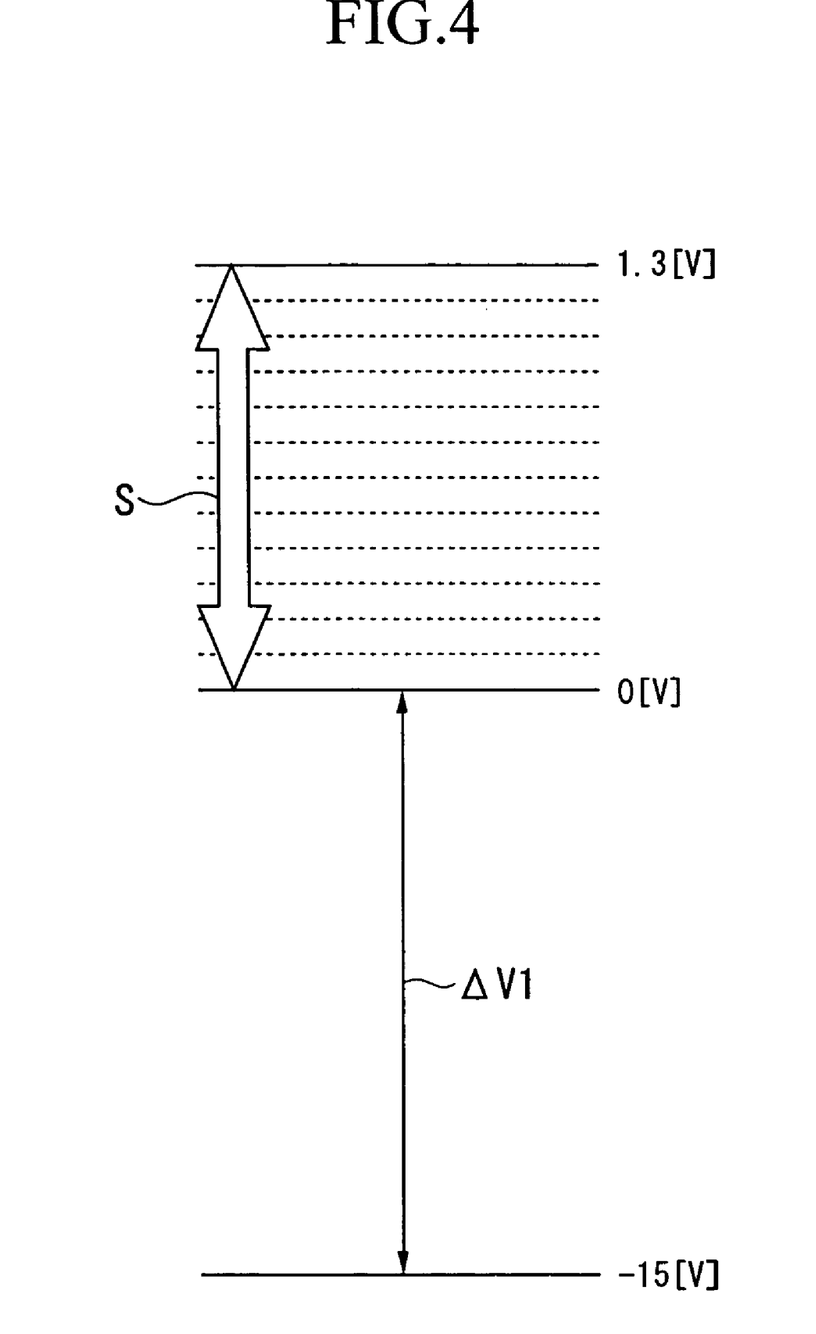
FIG. 4 is explanatory drawing showing the cell voltage detection sensor and the power generation state of a cell.

Each cell voltage sensor 25 is constituted to output a fixed value (for example, 0 V) as a measurement value when the voltage value of the respective cell is at or below a detection limit. This ensures the measurement accuracy required during normal power generation of the cells 3 (for example, 0 to 1.3 V) (see FIG. 4). Also, the stack voltage sensor 23 is one having sufficient accuracy for measuring the voltage Vs of the stack 4.

Figure 2:
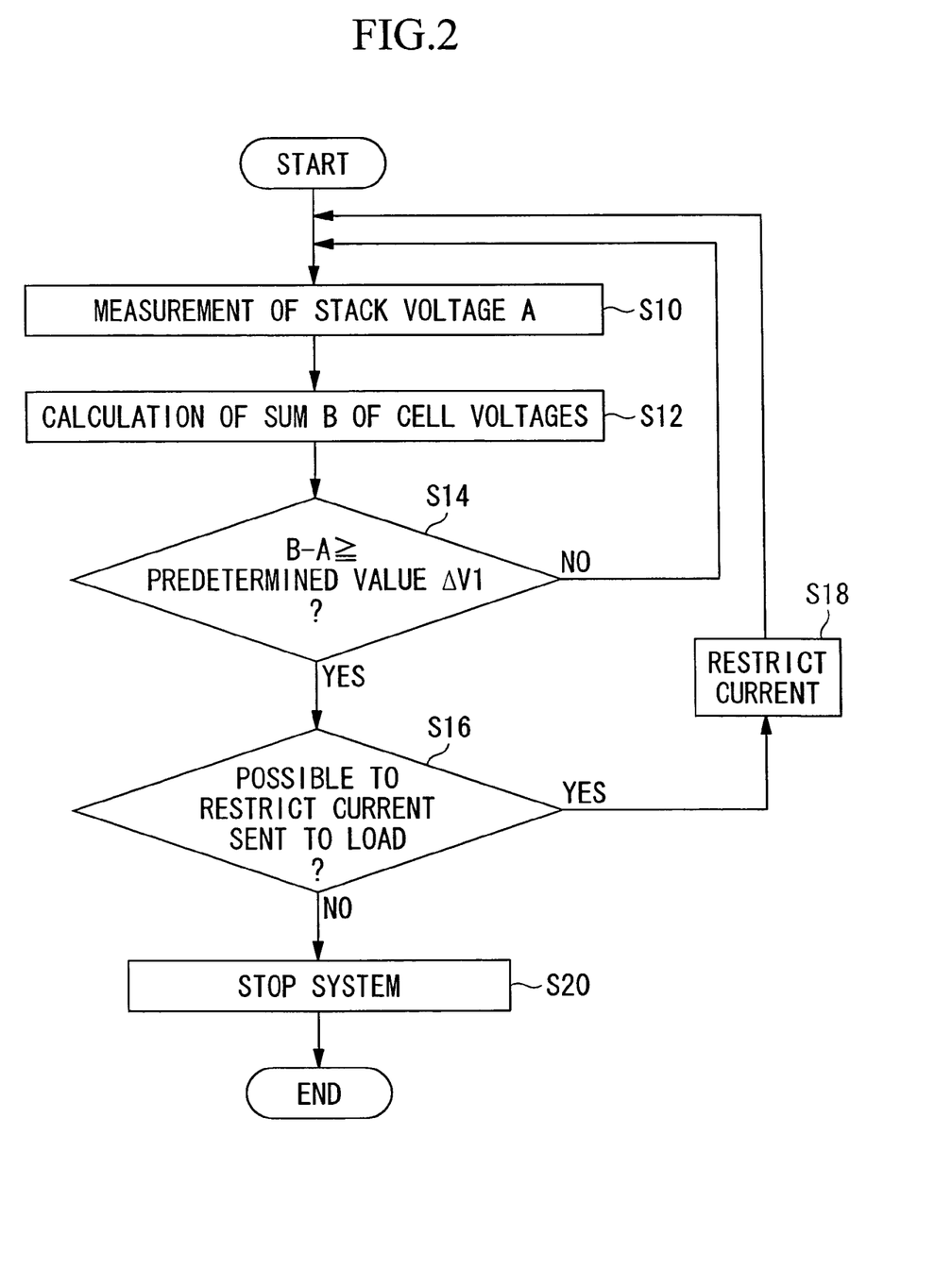
FIG. 2 is a flowchart showing the process of cell voltage determination of the fuel cell system shown in FIG. 1.

FIG. 2 is a flowchart showing the process of cell voltage determination of the fuel cell system shown in FIG. 1.

First, in step S10, a stack voltage A (=Vs) is measured by the stack voltage sensor 23. Next, each cell voltage (Vci) is measured by its respective cell voltage sensor 25, and the sum B ($=\Sigma Vci$) of the cell voltages is computed. Then in step S14, the difference between the sum B of the cell voltages and the measured value A of the stack voltage is calculated, and a determination is made as to whether this difference is greater than or equal to a predetermined value $\Delta V1$. If the determination result is YES, the process proceeds to step S16, and if the determination result is NO, the process returns to the process of step S10.

Figure 3A:
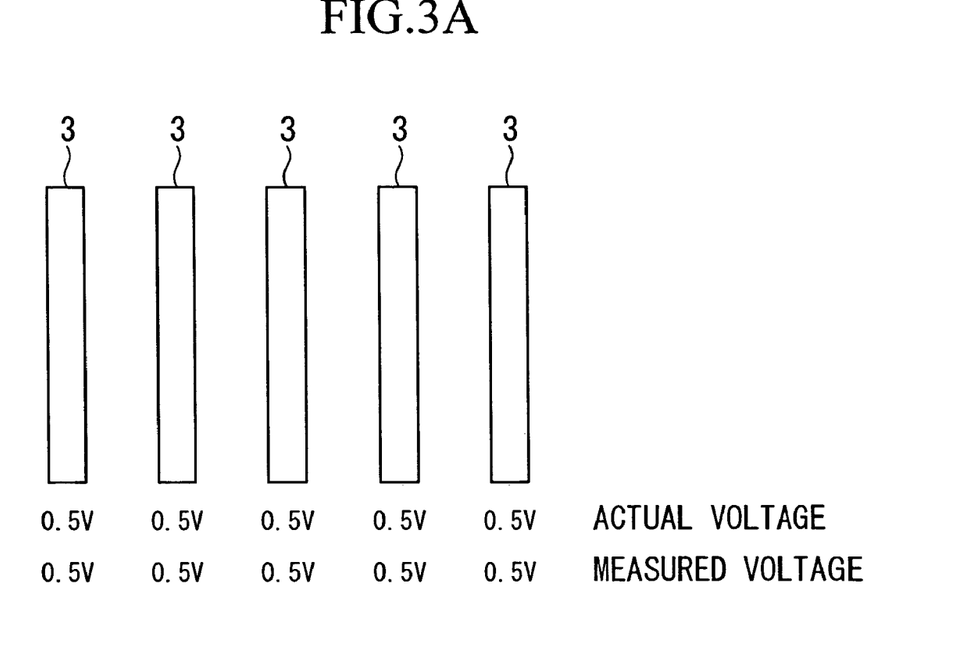
FIG. 3A is an explanatory drawing showing the state of normal power generation of the fuel cell.
Figure 3B:
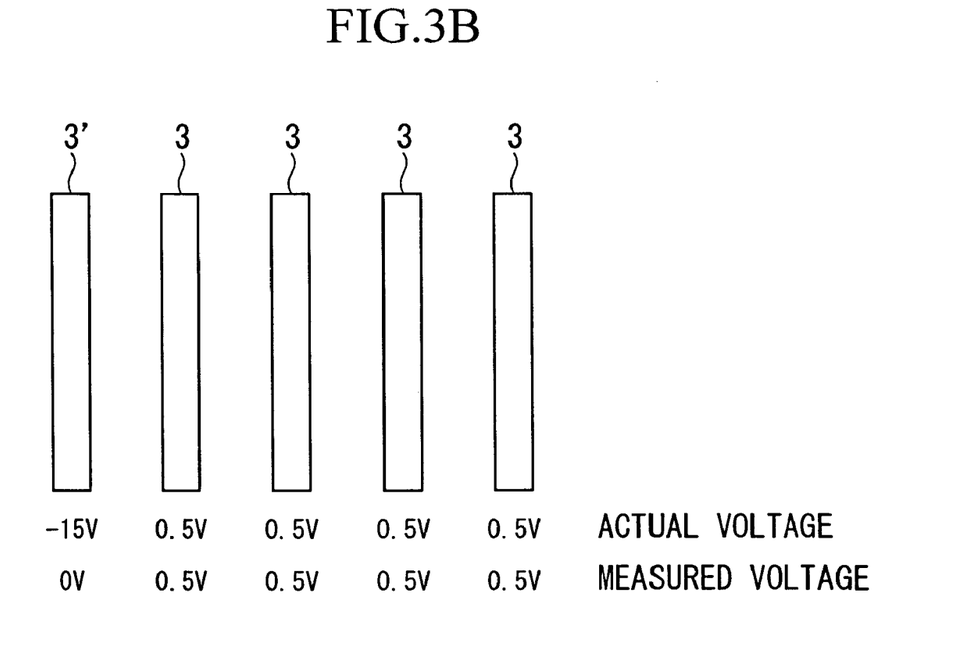
FIG. 3B is an explanatory drawing showing the state of a failed cell having occurred.

The meaning of this determination process will now be explained with reference to FIGS. 3A and 3B. FIG. 3A is an explanatory drawing showing the state of normal power generation, and FIG. 3B is an explanatory drawing showing the state when a failed cell has occurred. First, as shown in FIG. 3A, when each cell 3 is generating electrical power normally, since each cell voltage sensor 25 measures the voltage of its respective cell 3 with sufficient accuracy, the measured values are equivalent to the actual voltages. Also, the sum of the voltages generated by the cells 3 is reflected by the voltage measured by the stack voltage sensor 23. Therefore, when each cell 3 is normally generating power, the difference between the sum $\Sigma Vci$ of the voltages of the cells 3 measured by the cell voltage sensors 25 and the stack voltage Vs measured by the stack voltage sensor 23 is within the predetermined value $\Delta V1$.

FIG. 3B shows a drop in conductivity of the protons (hydrogen ions) in one of the cells constituting the stack 4. In this case, the electromotive force from the other cells 3 acts on that cell, causing its voltage to fall far lower than during normal operation. When this happens, (that is, when a failed cell 3' has occurred), the power generation voltage of this failed cell 3' is lower than the voltage detectable by the cell voltage sensor 25 (0 V). For this reason, the voltage value of the failed cell 3' in the cell voltage sensor 25 becomes a fixed value (0V).

Meanwhile, the voltage (−15 V) that fell extremely due to the failed cell 3' is reflected in the stack voltage Vs measured by the stack voltage sensor 23. Therefore, when the difference between the sum $\Sigma Vci$ (=B) of the voltages of the cells 3 (including the voltage of the failed cell 3') measured by the cell voltage sensors 25 and the stack voltage Vs (=A) measured by the stack voltage sensor 23 exceeds the predetermined value $\Delta V1$, it can be determined that the failed cell 3' has occurred, and the cell 3' in which the fixed value has been output by the cell voltage sensor 25 can be specified as a failed cell. Here, the predetermined value $\Delta V1$ is a value which should be ensured to prevent degradation of the fuel cell 2. That is, power generation is permitted as long as the difference between the sum $\Sigma Vci$ of the cell voltages and the stack voltage Vs is within the predetermined value $\Delta V1$.

In step S16, a determination is made as to whether it is possible to restrict the current 1 sent to the load 16. If this determination result is YES, the process proceeds to step S18, and if the determination result is NO, the process proceeds to step S20. In step S18, the current I sent to the load 16 is restricted, and the process returns to step S10. As ways of restricting the current I, the value of the current I itself may be decreased, or the time of sending the current I may be restricted. By performing this process, heat generated by the failed cell 3' itself can be suppressed, and by reducing the electromotive force acting on the failed cell 3', heat generated by the electromotive force can be suppressed. Thereby, power generation can be continued while minimizing degradation of the failed cell 3'.

In step S20, the fuel cell system 1 is stopped. Specifically, the cutoff valve 7 is closed to cut off the supply of hydrogen to the anode of the fuel cell 2, and the compressor 13 is stopped to cut off the supply of air to the cathode of the fuel cell 2. The process in the flowchart is then terminated.

In the present embodiment, since the fuel cell system 1 is a vehicle, although stoppage of the fuel cell system 1 means stoppage of the vehicle, when running is possible by another means, the process of step S20 may be replaced with stopping the power generation of the fuel cell 2.

As explained above, since the detectable range of the cell voltage sensor 25 can be limited to the voltage range during normal operation of the cells 3 according to the present embodiment, the measurement accuracy of the cell voltage sensor 25 can be maintained at accuracy sufficient during normal power generation. The stack voltage sensor 23 can also be one with a sufficient accuracy for measurement of the voltage Vs of the stack 4.

Moreover, by restricting the current flowing through the fuel cell 2, excessive heat generation by the failed cell 3' can be suppressed. Thereby, degradation of the parts constituting the fuel cell 2 can be prevented and operation of the fuel cell system 1 can be continued. Also, in the present invention, a failed cell 3' can be detected without newly installing a sensor just to detect drops in the cell voltage. Thereby, the power generating state of the cells 3 can be suitably grasped and the power generation performance of the fuel cell 2 can be secured while minimizing the number of components and cost as well as power consumption.

Figure 5:
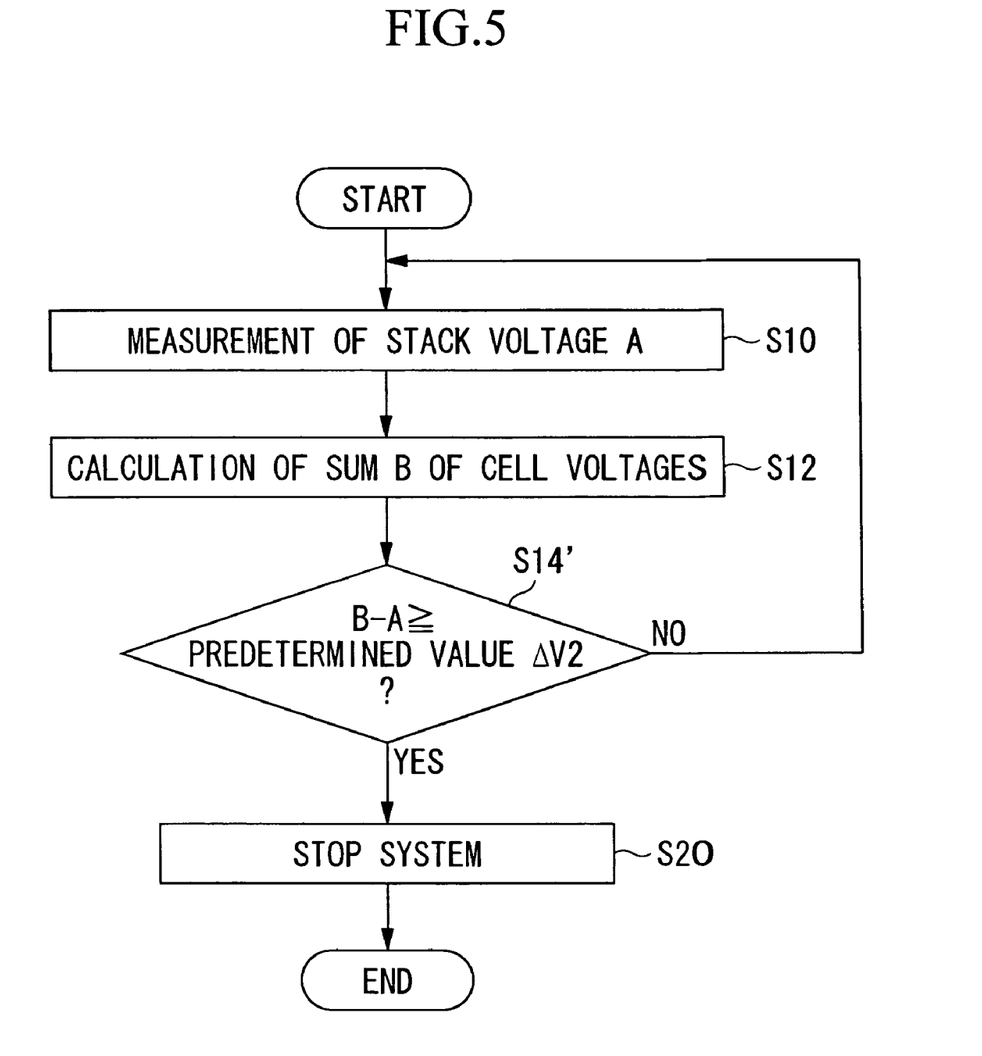
FIG. 5 is a flowchart showing another process of cell voltage determination of the fuel cell system shown in FIG. 1.

Next, a different process of cell voltage determination of the fuel cell system of the present invention than the one shown in FIG. 2 will be explained using FIG. 5. The point of difference in FIG. 5 from the process of FIG. 2 is that, as shown in step S14', it is determined whether or not the difference between the sum B of the cell voltages and the measured value A of the stack voltage is equal to or greater than the predetermined value ΔV2. If the determination result is YES, the process proceeds to step S20 and the fuel cell system 1 is stopped.

In this manner, since heat generation of the failed cell 3' itself and heat generation due to the electromotive force of the other cells 3 can be immediately eliminated, the failed cell 3' is protected from excessive heat generation, and the power generation performance of the fuel cell 3 can be secured. Here, the predetermined value ΔV2 is a value which should be ensured to prevent degradation of the fuel cell 2 similarly to the predetermined value ΔV1. In the sense of continuing power generation for as long as possible, it is preferable to set the predetermined value ΔV2 to be equivalent to or slightly greater than the predetermined value ΔV1.

While preferred embodiments of the invention have been described and illustrated above, it should be understood that these are exemplary of the invention and are not to be considered as limiting. For example, the embodiment described the fuel cell being mounted in a vehicle, but it may be applied to a fixed-type fuel cell system other than for a vehicle. Also, the embodiment explained the case of measuring the voltage of each cell, but the present invention can also be applied to the case of treating a plurality of cells as one cell group and measuring the voltage of that cell group.

Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A fuel cell system comprising:
   a fuel cell having a stack composed of stacked cells that generate electrical power from anode gas and cathode gas;
   a cell voltage measuring device connected to the cells to measure voltages of the cells, the cell voltage measuring device outputting a first predetermined value as a measurement value when the voltage of the cell being measured is at or below a detection limit and outputting the voltage of the cell as a measurement value when the voltage of the cell is detectable;
   a stack voltage measuring device connected to the stack that measures the voltage of the stack; and
   a control unit programmed to restrict a current flowing through the fuel cell when a difference between a sum of each measurement value of each cell measured by the cell voltage measuring device and the voltage of the stack measured by the stack voltage measuring device exceeds a second predetermined value.

2. The fuel cell system according to claim 1, wherein the control unit stops power generation of the fuel cell when the current through the fuel cell cannot be restricted.

3. A fuel cell system comprising:
   a fuel cell having a stack composed of stacked cells that generate electrical power from anode gas and cathode gas;
   a cell voltage measuring device connected to the cells to measure the voltages of the cells, the cell voltage measuring device outputting a first predetermined value as a measurement value when the voltage of the cell being measured is at or below a detection limit and outputting the voltage of the cell as the measurement value when the voltage of the cell is detectable;
   a stack voltage measuring device connected to the stack that measures the voltage of the stack; and
   a control unit programmed to stop power generation by the fuel cell when the difference between the sum of each measurement value of each cell measured by the cell voltage measuring device and the voltage of the stack measured by the stack voltage measuring device exceeds a second predetermined value.

4. A vehicle comprising:
   a vehicle body;
   wheels attached to the vehicle body; and
   the fuel cell system according to claim 1.

5. A method of controlling a fuel cell system equipped with a fuel cell having a stack composed of stacked cells that generate electrical power from anode gas and cathode gas, the method comprising the steps of:
   measuring voltages of the cells;
   outputting a first predetermined value as a measurement value when the voltage of the cell being measured is at or below a detection limit;
   outputting the voltage of the cell as a measurement value when the voltage of the cell is greater than the detection limit;
   measuring a voltage of the stack; and
   restricting a current flowing through the fuel cell when the difference between a sum of the voltages of each measurement value of each cell and the voltage of the stack exceeds a second predetermined value.

6. A method of controlling a fuel cell system equipped with a fuel cell having a stack composed of stacked cells that generate electrical power from anode gas and cathode gas, the method comprising the steps of:
   measuring the voltages of the cells;
   outputting a first predetermined value as a measurement value when the voltage of the cell being measured is at or below a detection limit;
   outputting the voltage of the cell as the measurement value when the voltage of the cell is above a detection limit;
   measuring the voltage of the stack; and
   stopping power generation of the fuel cell when the difference between the sum of the voltages of each measurement value of each cell and the voltage of the stack exceeds a second predetermined value.

* * * * *

UNITED STATES PATENT AND TRADEMARK OFFICE
CERTIFICATE OF CORRECTION

| | |
|---|---|
| PATENT NO. | : 7,704,619 B2 |
| APPLICATION NO. | : 11/354359 |
| DATED | : April 27, 2010 |
| INVENTOR(S) | : Yosuke Fujii et al. |

It is certified that error appears in the above-identified patent and that said Letters Patent is hereby corrected as shown below:

Title page, section (73) Assignee, "Tochigi (JP)" should be --Tokyo (JP)--

Signed and Sealed this

Seventeenth Day of August, 2010

David J. Kappos
*Director of the United States Patent and Trademark Office*